July 2, 1968 — T. L. McKAY — 3,390,712
SELF-LOCKING FASTENER
Filed Dec. 22, 1966 — 7 Sheets-Sheet 1

INVENTOR:
Thomas L. McKay
By Smyth, Roston & Pavitt
Attorneys

July 2, 1968

T. L. McKAY 3,390,712

SELF-LOCKING FASTENER

Filed Dec. 22, 1966

INVENTOR:
Thomas L. McKay

By Smyth, Roston & Pavitt
Attorneys

INVENTOR:
Thomas L. McKay
ATTORNEYS

United States Patent Office 3,390,712
Patented July 2, 1968

1

3,390,712
SELF-LOCKING FASTENER
Thomas L. McKay, Los Angeles, Calif., assignor, by mesne assignments, to Whittaker Corporation, Los Angeles, Calif., a corporation of California
Continuation-in-part of application Ser. No. 417,171, Dec. 9, 1964. This application Dec. 22, 1966, Ser. No. 609,984
12 Claims. (Cl. 151—24)

ABSTRACT OF THE DISCLOSURE

A self-locking screw wherein the screw has an axial bore with radial apertures to retain radially movable locking members. A spindle that is longitudinally movable in the axial bore has an enlargement to cam the locking members radially outward. The spindle and the locking members are shaped for tongue-and-groove interlock to prevent relative rotation of the spindle throughout the cam action and the spindle and the locking members have mutually contacting surfaces of linear cross section for at least line contact with each other, such line contact being maintained throughout the cam action by virtue of the tongue-and-groove interlock.

---

This application is a continuation-in-part of my application Ser. No. 417,171 entitled "Self-Locking Fastener," filed Dec. 9, 1964, now abandoned.

This inventon relates to self-locking fasteners for locking two structural members together such as access panels to structural frame members or to other panels; such structural frame members or other panels sometimes called understructure. These self-locking fasteners are particularly useful in aircraft and missile installations where it is desired to provide quick access to electronic, hydraulic and other equipment housed therein, and inasmuch as any access panel would ordinarily carry a multiplicity of such self-locking fasteners, they must be capable of quick action, permitting ready removal and ready replacement of the access panel within the shortest possible time. Further, inasmuch as a considerable number of access panels and fasteners are utilized in any aircraft or missile, another requirement for such fasteners is that they be constructed as inexpensively as possible, yet perform under adverse conditions.

Presently known self-locking fasteners comprise a headed screw which may or may not be attached to the access panel and a complex screw receptor which is attached to the understructure to which includes means for attaching two receptors to the panel and for locking the screw in the receptor. It has been found, however, that while these presently known fasteners perform well and serve a useful purpose they are also quite expensive to manufacture because of their complexity and there is a demand for a cheaper and more inexpensive version of self-locking fasteners which will perform well.

The self-locking fastener which meets the aforesaid requirements and the demand for an inexpensive fastener and embodying the teachings of this invention contains the means for locking the fastener to the understructure and eliminates the need for the complex screw receptors utilized in presently known self-locking fastener.

As will be clear from the more detailed description hereinafter, this invention comprises a headed fastener with a thin or small center line axial bore which extends through the fastener head and into a counterbore adjacent the end of the fastener shank to receive a spindle in the axial bore and a locking element actuator in the counterbore. One end of the spindle extends into the head of the fastener where the spindle may be actuated by a tool and is connected at its other end to the locking element actuator which, in turn, motivates one or more radially outwardly extending locking elements or retaining devices for engagement with the understructure. If the fastener of this invention is in the form of a screw, then the tool which actuates the spindle may be the screwdriver and which when inserted into the screwhead to torque the screw, the locking elements are retracted so that the screw may be turned into the understructure in the conventional manner. Later, when the screwdriver is removed, the locking elements are actuated radially outwardly by spring means acting on the actuator, causing the screw to be locked in position in engagement with the understructure.

In one embodiment, one or more of these locking elements engage the undersurface of the understructure, and in another embodiment one or more of these locking elements engage the threads of the aperture in the understructure. This latter embodiment may also include a spindle which has its own threaded head within the screw head to motivate the locking elements radially outwardly or inwardly without the use of spring means. By threading the spindle head in or out relative to the screw head, the amount of torque that the locking elements impose on the understructure can be controlled. These plugs may have pre-cut threads to engage the threads of the understructure in this latter embodiment, or may cut their own threads as the screw is torqued through the understructure, depending upon the selection of the material used in forming the locking elements. The fastener comprising this invention may also be in the form of a bolt having an unthreaded shank insertable through apertures in the access panel and understructure. In this instance, the tool to actuate the locking element actuator may simply be a punch insertable into the small bore in the bolt head to engage the spindle to retract the locking elements as the fastener is inserted into the understructure and which when removed allows the locking elements to lock the fastener to the understructure.

Another feature of the invention disclosed herein is that the spindle may be provided with an enlarged head to form a push-pull tab so that it can be actuated by hand without the use of a screwdriver or other tool. That is to say, in this embodiment, the locking element actuator may be activated by a simple push-pull manipulation of the spindle with respect to the head of the fastener without imposing pressure on the access panel which makes this embodiment particularly useful in conditions of weightless space. As can be appreciated, any presently known self-locking fastener requires torque to be imposed on the fastener before it can be removed. This complicates the removal of the access panel in weightless space due to the fact that a reaction force on the vehicle or on the person himself is developed when a fastener is torqued, which reaction force would tend to move the person and the vehicle apart. On the other hand, with this invention, the spindle can be actuated to lock or unlock the fastener without imposing a force on the panel inasmuch as the push-pull tab may be actuated with reference to the fastener itself, thus eliminating reaction force on the access panel and vehicle. As hereinabove stated, this fastener thus overcomes the deficiencies in this regard of prior art fasteners for use in weightless space vehicles.

Other and additional advantages and features of the present invention will become apparent to those skilled in the art from a study of the accompanying specification and drawings which form a part thereof, and wherein:

Turning now to the embodiment of the invention illustrated in FIGURES 1–5, inclusive, it can be seen that the fastener in the form of a screw 10 incorporating the invention comprises an enlarged head 12 having a reduced shank 14 conventionally externally threaded as at 16 throughout part of its length. The screw 10 is shown threadibly inserted into the threaded bore 18 of a lower panel or understructure 20 to removably fasten an upper or access panel 22 thereto; the latter being bored as at 24 to accommodate the insertion of the shank 14 therethrough.

Figures 1, 2, 3, 4:
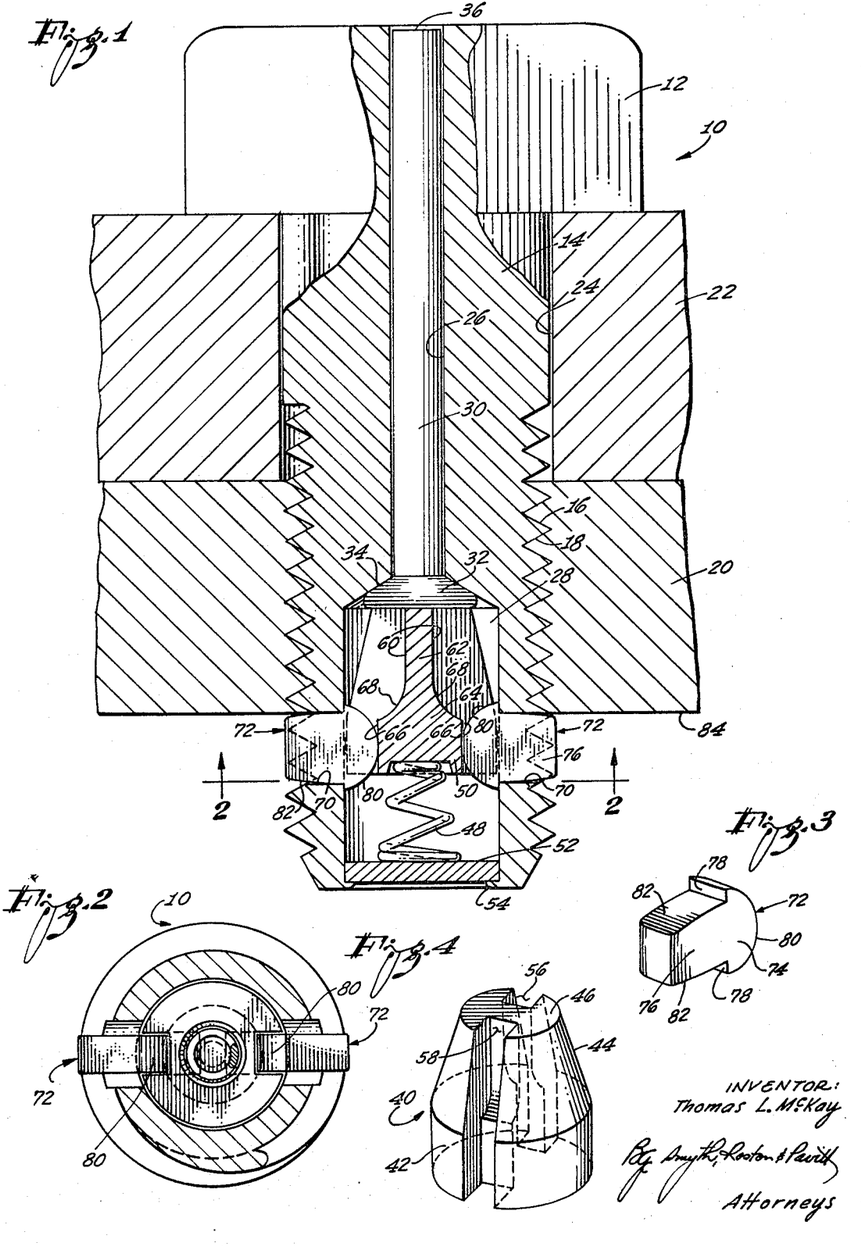
FIGURE 1 is a cross-sectional view in elevation of a self-locking fastener in the form of a screw embodying the teachings of this invention and showing the self-locking screw in its locked position.
FIGURE 2 is a cross-sectional view taken along line 2—2 of FIGURE 1.
FIGURE 3 is a perspective view of one of the locking elements or retaining devices used in connection with the invention shown in FIGURES 1 and 2.
FIGURE 4 is a perspective view of the locking element actuator illustrated in FIGURES 1 and 2.

In the embodiment illustrated, the screw 10 has been provided with a relatively narrow coaxial internal centerline bore 26 throughout the entire length of the head 12 and shank 14. The shank 14 is also counterbored as at 28 from the end of the shank opposite the head 12 a distance, which in the embodiment shown, is less than half the length of the shank. A shaft or spindle 30 having a diameter only slightly less than the diameter of the bore 26 is inserted into the bore 26. The spindle is provided with an enlarged end or head 32 which engages the upper wall 34 of the counterbore 28 to limit the upper movement of the shaft 30 and in that position, the shaft 30 is of such a length that its end 36 is slightly recessed in the head 12.

The counterbore 28 is provided with a locking element actuator, indicated in its entirety as 40, and as more clearly illustrated in FIGURE 4, is provided with a cylindrical base 42, the diameter of which is only slightly less than the diameter of the counterbore 28, and a conical upper section 44 providing a taper which ends in an end wall 46 of reduced size. The end wall 46 engages the end of the head 32 of the spindle 30 as clearly illustrated in FIGURE 1. The surface 46 is held in engagement with the enlargement 32 by a coil spring 48 which engages the bottom wall 50 of the actuator 40 and a closure plate 52. The closure plate 52 serves to close the counterbore 28 and is held in the counterbore by coining or swaging the lower end of the screw 10, as illustrated at 54.

The actuator 40 is also provided with a pair of radially oppositely opening milled grooves or slots 56 and 58 cut to a depth to provide oppositely facing surfaces 60 spaced apart by only a narrow portion 62 and a wide portion 64 which define oppositely facing lands 66, the width of which are substantially coextensive with the width of the cylindrical portion 42, separated by curved or sloping surfaces 68. Sloping surfaces 68 are curved in the embodiment illustrated because they are cut by a milling tool but could be tapered by use of another tool if desired.

As further illustrated in FIGURE 1, the shank 14 is also provided with a pair of substantially rectangular openings 70 which are formed normal to the centerline of the shank, that is, on its radius line cutting the threads 16 and opening into the counterbore 28. In each of these apertures 70, there is provided a pair of locking elements or retaining devices 72; one such locking element 72 being illustrated in that figure, the locking element 72 has an enlarged head 74 and a reduced extension or shank 76 separated by shoulder 78. The head 74 is provided with a curved semicircular surface 80 and the shank 76 is provided with slightly curved surfaces 82.

Returning now to FIGURE 1, it can be seen that the locking elements 72 are inserted into the openings 70 with their shoulders 78 engaging the inner surface of the counterbore so that further radial outward movement through the openings is prevented thereby. The curved surfaces 80 engage the surfaces of each of the grooves 56 and 58 and in the position illustrated in FIGURE 1 which is the position of maximum radial extension of the locking elements 72 the shanks 76 engage the inner surface 84 of the understructure 20; the spacing between the surface 82 of the locking elements and the understructure of the head 12 being such that the access panel 22 is locked tight to the understructure 20.

Figure 5:
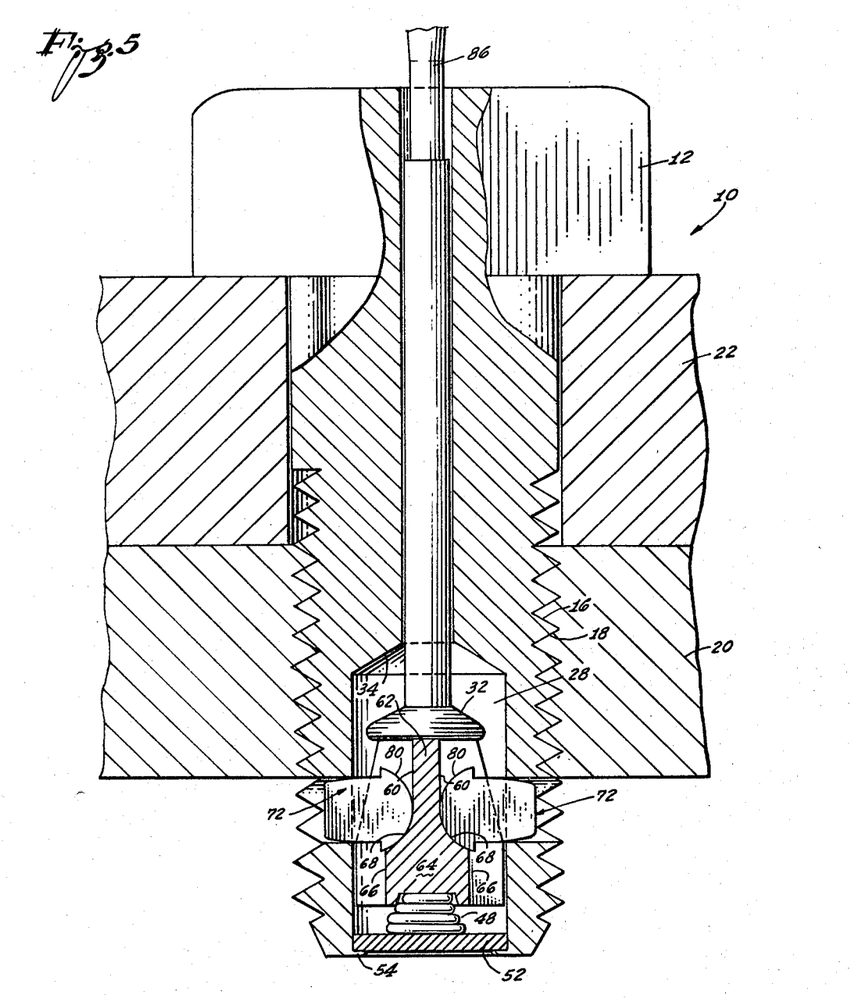
FIGURE 5 is a cross-sectional view in elevation illustrating the self-locking screw of FIGURES 1–4 in its unlocked position.

Turning now to FIGURE 5, it can be seen that any suitable tool such as a punch 86 may be used to depress the spindle 30, that is, urge it in a direction against the bias of the spring 48 so that the spindle moves downwardly as viewed in FIGURES 1 and 5 where the locking elements 72 are free to move radially inwardly with their curved surfaces 80 moving upwardly on the curved surfaces 68 of the actuator 40.

In the embodiment just described, the punch 86, while illustrated as a separate tool, may be part of another tool such as, for example, an Allen wrench if the head 12 of the screw is designed to receive an Allen wrench, or if the screw head 12 is formed to receive a conventional screwdriver, then the bore 26 will terminate, of course, in the slot (not shown) designed to receive the screwdriver. In the latter case, the screwdriver itself, when inserted in the head 12, will depress the spindle 30 to allow the locking elements 72 to move radially inwardly. In this manner, as the screw is threaded into the threaded bore 18 of the understructure, the locking elements 72 are in their radially inward position and when the head 12 is bottomed onto the panel 22 and the screwdriver removed, the spring 48 will urge the actuator upwardly with a consequent radially outward movement of the locking elements 72 to a position shown in FIGURE 1, locking the screw in position by engagement with the underside of the lower panel 20. Conversely, to remove the screw 10, the insertion of the tool 86 or a screwdriver, as the case may be, will again depress the spring 48 so that the locking elements 72 may be allowed to move inwardly, thus releasing the locking function of the locking elements 72; their inward movement being accomplished by the threads of the bore 18 as the screw 10 is removed.

In the embodiment of the invention illustrated in FIGURES 6–10, components and parts having similar function to components and parts of the embodiment in FIGURES 1–5 are given like reference numerals with the addition of the suffix "a."

Figures 6, 7, 8:
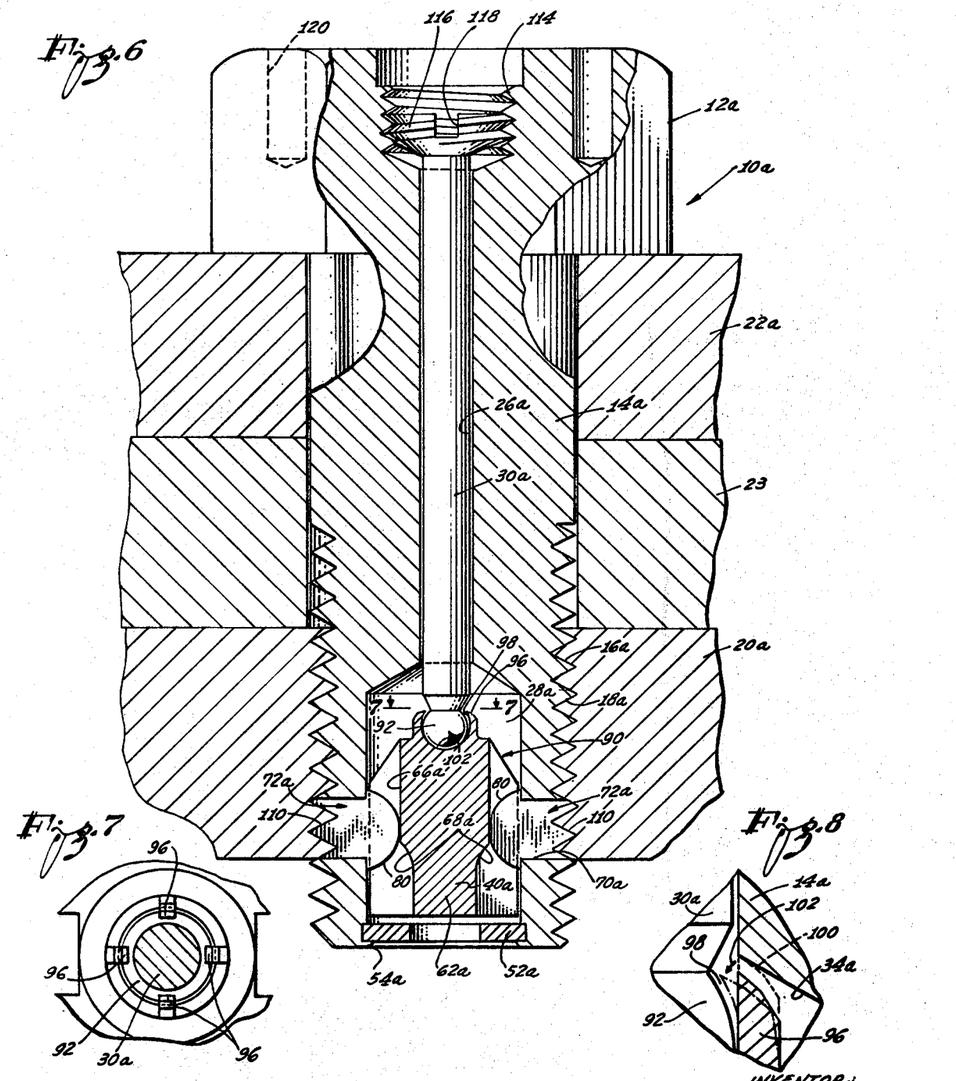
FIGURE 6 is a cross-sectional view in elevation of another embodiment of this invention and shown in its locked position.
FIGURE 7 is a cross-sectional view taken along line 7—7 of FIGURE 6.
FIGURE 8 is an enlarged detail view showing the manner of attaching the locking element actuator to the plunger shown in FIGURES 6 and 7.

With particular reference to FIGURE 6, it can be seen that the screw 10a has a head 12a and a shank 14a threaded as at 16a to be threadably received in the threaded bore 18a of an understructure 20a so as to fasten panels 22a and 23 thereto. In this embodiment, the shank 14a is long enough to accommodate two panels 22a and 23 but otherwise the outside configuration of the screw is identical to the screw illustrated in FIGURES 1–5.

Screw 10a is bored centrally as at 26a and counterbored as at 28a to receive a shank or spindle 30a and an actuator 40a. Similarly, the counterbore 28a is closed by a closure plate 52a swaged therein as at 54a.

In this embodiment, however, it is to be noted that the spring 48 is omitted and the actuator 40a is attached to the spindle 30a by a ball and socket arrangement 90 so as to be moved upwardly and downwardly, as illustrated in the drawings by the upward and downward movement of the spindle 30a. In this embodiment, the spindle 30a terminates in a sphere or ball 92 which is inserted in a hemispherical indentation or socket 94 formed in the top of the actuator 40a and held in this socket by a plurality of prongs or extensions 96 bent around the outer surface of the ball 92 and into groove 98 formed between the end of the spindle 30a and the ball 92. As more clearly shown in FIGURE 8, these prongs 96 being normally in a vertically straight position, as illustrated in the dotted lines 100, are urged into the groove 98 by the upward movement of the ends of these prongs against the inclined end 34a of the counterbore 28a; such engagement moving the very ends of the prongs in a direction of the arrow 102.

With the prongs in their gripping position, it can be appreciated that movement of the spindle 30a upward or downward will move the actuator 40a upward or downward.

Figures 9, 10, 11:
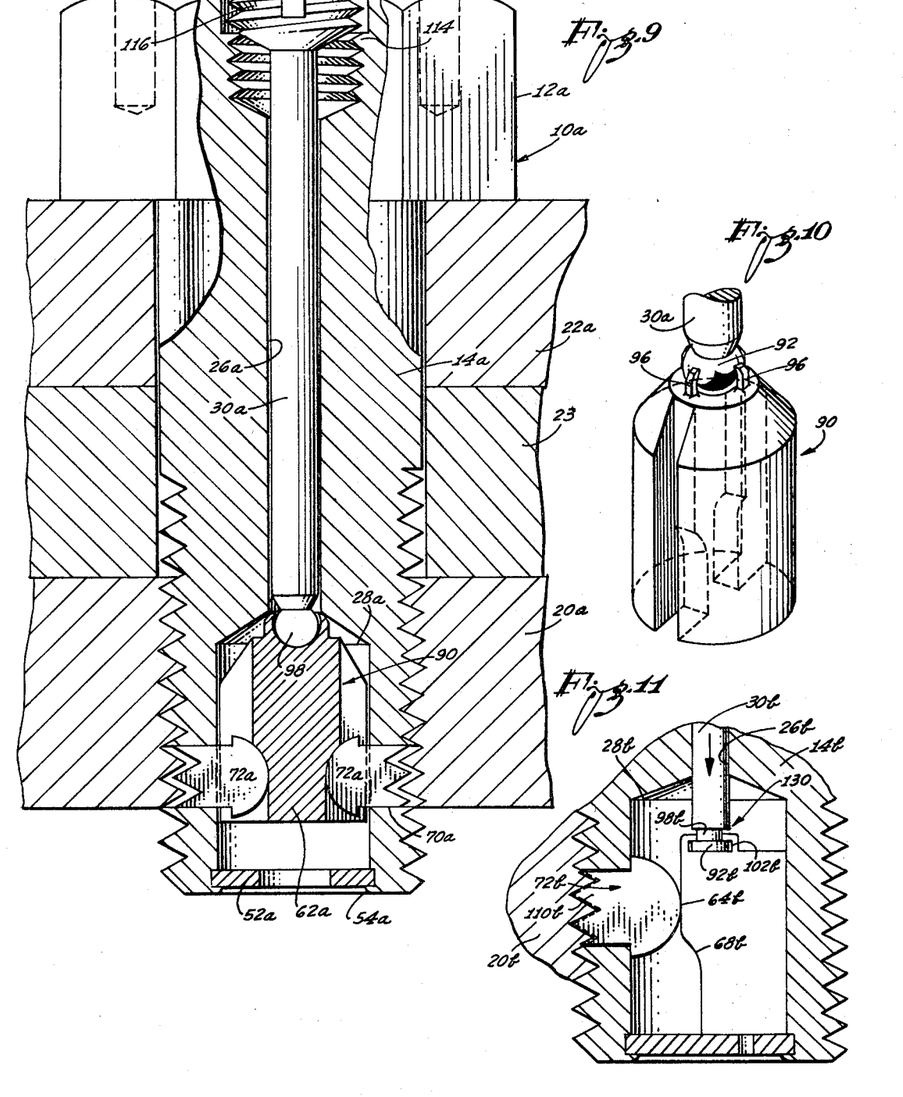
FIGURE 9 is a cross-section view in elevation showing the self-locking screw of FIGURES 6–8 in its unlocked position.
FIGURE 10 is a perspective view of the plunger and locking element actuator of FIGURES 6–9.
FIGURE 11 is an elevational view, partly in cross section illustrating the self-locking screw utilizing a locking element on one side only.

In this embodiment, it can be seen also that the land 66a and the inclined surfaces 68a which terminate in the narrower portion 62a are reversed in their direction from that shown in FIGURES 1 and 5, but their operation is substantially the same. That is to say, when the locking element actuator 40a is in its lowermost position, the locking elements 72a are in their radially outer position such as shown in FIGURE 6 and when the actuator 40a is in its uppermost position as illustrated in FIGURE 9, the locking elements are in their radially innermost position. This embodiment illustrates another form of the locking elements or retaining devices and differs from the embodiment illustrated in FIGURES 1–5 where the locking elements engage the bottom surface 84 of the understructure 20. Herein, the locking elements 72a are provided at their outer ends with threads 110 which engage the threads of the bore 18a when the locking elements are in their radially outer position as shown in FIGURE 6, that is, in a position with locking engagement with the threads. Further, as shown in FIGURE 9, the locking elements disengage the threads of bore 18a and retract within the bores 70a and 72 when in inoperative position.

It can be appreciated that in the embodiment of FIGURES 1–5, the locking elements of the embodiment illustrated in FIGURES 6–9 could be used in lieu of the locking elements 72a and vice versa; the selection of the locking elements being determined by the intended use of the self-retaining screws 10 or 10a.

However, with the use of the locking elements 72a, another advantage is accomplished when used in the fastener illustrated in FIGURES 6–10, and that advantage is accomplished as follows. Turning now to FIGURES 6 and 9, it can be seen that the head 12a, instead of terminating as illustrated in FIGURE 1, is counterbored and threaded as at 114 so that an enlarged head 116 forming part of the spindle 30a may be threaded in and out of this threaded counterbore to move the actuator 40a upward and downward. This threaded movement is accomplished by a screwdriver in slot 118 and the relative rotational movement between the spindle 30a and the actuator 40a is permitted by reason of the ball joint attaching means 90 previously described. This embodiment has the advantage in providing controlled torque for the fastener, that is, the amount of force applied against the threads of bore 18a by the expansion of the locking elements 72a dependent upon the distance that the head 116 is threaded into the tapered counterbore 114. In other words, the inclined surfaces 68a will urge the locking elements 72a radially outwardly, dependent upon the position of the actuator 40a, and the force applied is dependent upon the position of the actuator relative to the retaining device 72a.

In operation of this embodiment, the head 12a is provided with a pair of bores 120 to receive a wrench, such as a spanner wrench, and the screw is tightened into the understructure 20a in a conventional manner. After the head 12a is bottomed against the top of the panel 22a, a screwdriver is inserted into the counterbore to engage the slot 118 to turn the spindle 18a and move the actuator downwardly so that the locking elements 72a are urged outwardly. To remove the self-locking screw 10a, it is simply necessary to retract the locking elements by unthreading the head 116 and thereafter unthreading the screw 10a out of the threaded bore 18a.

All of the different embodiments of the invention described to this point are characterized by the concept of maintaining line contact as distinguished from point contact between the locking elements and the spindle throughout the cam operation. Line contact is achieved by making the bottom of each groove in the camming region perpendicular in cross section to a radius of the spindle that intersects the bottom of the groove and by making the cooperating surface of the associated locking element also perpendicular to the same radius. Thus in FIG. 1 a radius from the surface of the spindle lying in the plane of the sheet of drawings is perpendicular to the cross section of the bottom of the cam groove and is also perpendicular to the cross section of the associated surface of the locking element. It is to be noted that the maintaining of line contact in this manner requires that the spindle be locked against rotation relative to the locking element. The spindle is locked against rotation by the continuous engagement of the locking elements with longitudinal grooves in the spindle. The maintaining of line contact during the camming action avoids an extremely high concentration of stresses that would be inherent in point contact. As a consequence of the distribution of the stresses, applicant's device operates more efficiently and with a long service life without appreciable deterioration.

Turning now to FIGURE 11 where still another embodiment of the present invention is illustrated with like parts having like reference numerals except for the suffix "b," it can be seen that only the shank 14b is illustrated. This shank is provided with threads 16b to be received in a threaded bore as previously described in connection with the other embodiments and it is bored as at 26b and counterbored as at 28b to receive a spindle 30b and an actuator 40b. In this embodiment, like previous embodiments, the counterbore is closed by a closure wall 52b swaged therein as at 54b.

This embodiment differs from the previous embodiments, however, in that the actuator 40b is provided with a land 66b and an inclined surface 68b only on one side to actuate only one locking element 72a, as illustrated. In this figure, in lieu of the ball and socket arrangement 90, as illustrated in connection with FIGURE 6, there is provided a tongue and groove arrangement, indicated in its entirety as 130 and which comprises a reduced portion or neck 98b on the spindle 30b which defines a head 92b which is received in a corresponding groove or socket 102b, in the actuator 40b. With this arrangement, the actuator may move up and down (as illustrated in the drawing) with the upward and downward movement of the spindle 30b to move the locking element 72b radially inwardly or outwardly to impose a force on the corresponding thread in the understructure (not shown).

Reference is made to the preferred embodiments of this invention as shown in FIGURES 12–15. It can be seen that there is therein illustrated in FIGURES 12–13 one illustration of the preferred embodiment which comprises a bolt 10c having an unthreaded shank 14c and a head 12c with an external bore 36c and counterbore 28c closed by an end plug 52c. In this embodiment, however, the spindle 30c and the actuator 40c are of one-piece construction. The tapered wall 44c and land 42c form a unitary part of the spindle with the tapered wall 44c performing the function of surfaces 68, 68a and 68c and with the land 42c performing the function of surfaces 66, 66a and 66b.

Figures 12, 13, 14, 15:
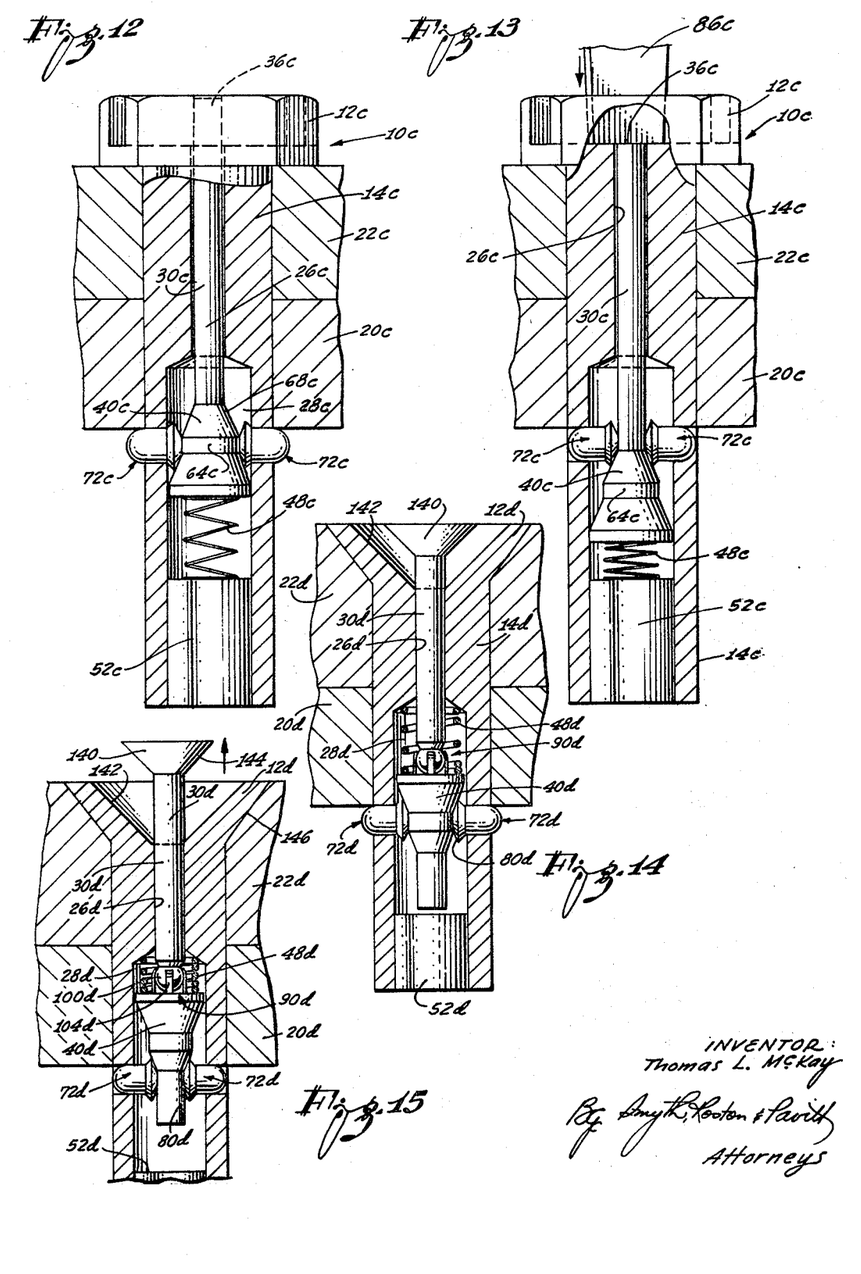
FIGURE 12 is a cross-sectional view in elevation illustrating the prefered embodiment of the invention incorporated in a bolt and shown in its unlocked position.
FIGURE 13 is a cross-sectional elevational view illustrating the embodiment of FIGURE 12 in its locked position.
FIGURE 14 is a cross-sectional elevational view of still another embodiment of the invention and illustrated in its locked position.
FIGURE 15 is a cross-sectional elevational view illustrating the embodiment of FIGURE 14 in its unlocked position.

In this embodiment, the locking elements 72c are urged radially outwardly in a manner like that previously described in connection with the embodiment of FIGURES 1–5, inclusive, by action of the spring 48c. Similarly, the end 36c of the spindle 30c may be moved downwardly by action of a screwdriver or plunger 86c against the bias of springs 48c to allow the locking elements 72c to remain radially inwardly. With the removal of the screwdriver 86c, the spring 48c will again urge the locking elements 72c radially outwardly against the undersurface 84c of the understructure 24c. It is to be noted that while this embodiment is described in connection with a screwdriver and slot with a hexagonal head 12c and an unthreaded shank 14c, obviously the invention may be incorporated in a threaded shank such as those previously described and with any type of selected head; the unthreaded shank being for the purpose of illustration only of the more simplified version of the combined spindle and actuator.

Turning now to FIGURES 14 and 15, it can be seen that in this illustrated embodiment, the actuator 40d is a duplicate of the actuator shown in FIGURES 12 and 13 except that it is reversed in its function and operation so that downward movement of the spindle 30d will cause radially outward movement of the locking elements 72d and, conversely, upward movement of the spindle against the bias of the compression spring 48d will allow the locking elements to retract.

In this embodiment, the upper end of the spindle is enlarged as at 140 to form a push-pull tab to permit the operator to pull the spindle 30d upwardly to cause the release of the locking elements 72d and to press the push-pull tab enlargement downwardly to urge the spindle downward to cause the locking elements to be urged radially outwardly into their locking position, as illustrated in FIGURE 14. For purposes of allowing the enlargement 140 to be grasped, the head 12d of the fastener is provided with a countersink 142 somewhat larger than the tapered surface 144 of the enlarged head 140 to permit the fingers to reach in the countersink and pull the spindle outwardly upwardly when releasing the locking elements. Thus, with this push-pull tab, all force imposed on the spindle may be relative to the fastener itself without reference to the access panel or the person. This is particularly useful where the operator desires to remove the panel 22d under conditions of weightlessness, for example, in using the fastener 10d in space vehicles. It is to be noted also that the head 12d is of the type which may be recessed into the panel 22d, the panel being countersunk as at 146 so that the head will be flush with the outer surface of the panel 22d. Further, in connection with the embodiment illustrated in FIGURES 14 and 15, it is to be noted that the actuator is provided with a variation of the ball and socket connecting arrangement 90d which corresponds in function and operation to the ball and socket arrangement 90 described in FIGURES 1–6. However, in this embodiment, the spring 48d has been added since this embodiment does not utilize the threaded head 116 as a torque applicator, as previously described in connection with the embodiment of FIGURES 6–10.

Further, it has been noted in connection with the locking element 72d that for purposes of illustration, the surfaces 80d are shown as a truncated cone rather than curved as shown in FIGURES 3 and 5. Likewise, the shanks 76d of the locking plugs are cylindrical to fit a circular hole 70d to show, by way of example, the variation in the locking elements which may be used in this invention.

Finally, it should be apparent that the locking elements can be made of any suitable material such as bronze or aluminum or any plastic material such as nylon or Teflon and in the case where the plastic locking elements are to be urged against the threads of the core in the understructure, such as illustrated in FIGURES 6–10, inclusive, they need not be prethreaded but can cut their own threads as the locking screw is threaded into the threaded bore 18 of the understructure.

Figure 16:
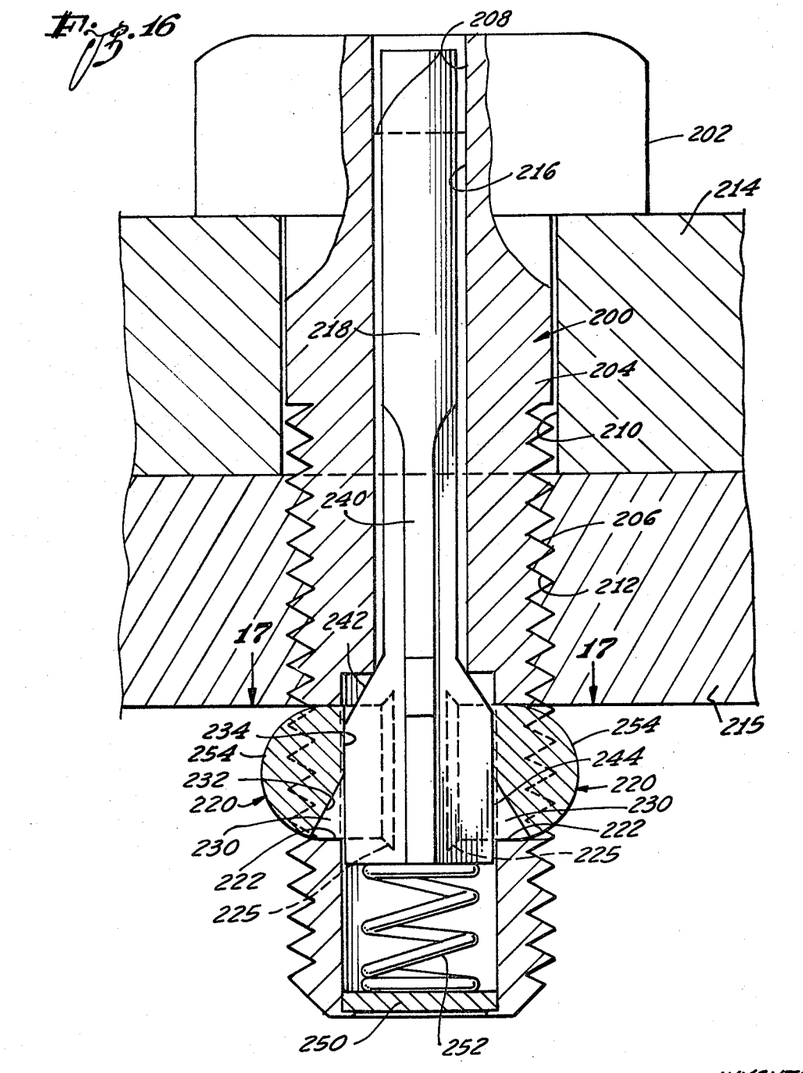
FIGURE 16 is a cross-sectional elevational view of still another embodiment of the invention.
Figure 17:
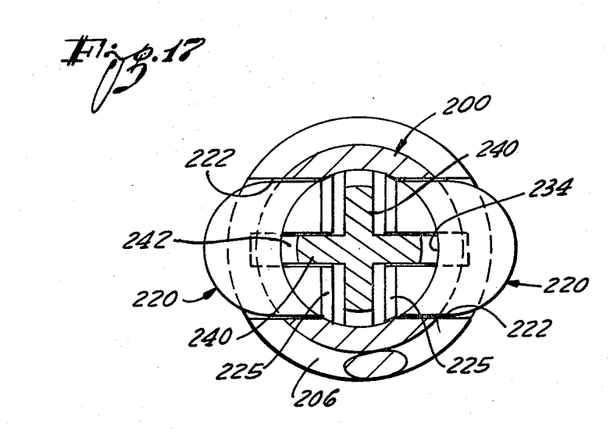
FIGURE 17 is a transverse cross section taken as indicated by the line 17—17 of FIGURE 16.
Figure 18:
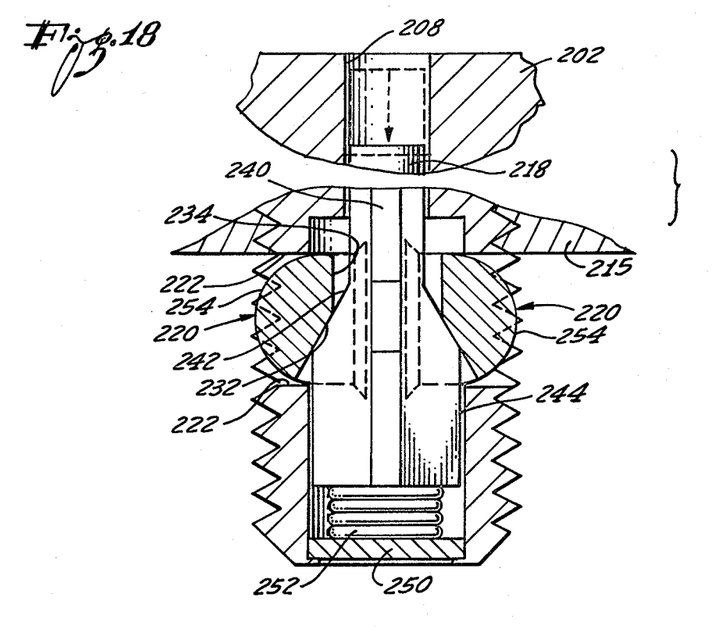
FIGURE 18 is a broken cross-sectional elevational view of the embodiment shown in FIGURE 16 with the locking elements retracted for withdrawl of the fastening member.

The embodiment of the invention shown in FIGURES 16–18 comprises a fastening member, generally designated 200, having a head 202 and a shank 204, the shank having a screw thread 206. The head 202 of the fastening member is formed with a slot 208 for rotation of the fastening member by a screwdriver. The fastening member is shown in installed position extending through aligned bores 210 and 212 of two members 214 and 215, respectively, the bore 212 being internally threaded for engagement by the screw thread 206.

The fastening member 200 has the usual axial bore 216 in which is slidingly mounted a suitable spindle 218, the purpose of the spindle being to control two diametrically opposite locking elements 220. The locking elements 220 are slidingly mounted in corresponding radial bores 222 in the shank 204, each locking element being enlarged at its inner end as indicated at 225 to prevent escape of the locking element from the radial bore.

Each of the two locking elements 220 is formed with a groove 230 on its inner end that extends longitudinally of the spindle 218. The bottom of each of the grooves 230 is divided into two planar surfaces, namely, planar surface 232 that is inclined relative to the axis of the spindle and a planar surface 234 that is parallel to the axis of the spindle. In transverse cross section, the bottom of the groove 230 along both the surfaces 232 and 234 is perpendicular to a radius from the axis of the spindle 218.

For cooperation with the two locking elements 220, the spindle 218 is provided with an enlargement for cam action against the two locking elements. In the construction shown, the spindle is formed with four longitudinal ribs 240 at 90° apart and two of the ribs that are diametrically opposite from each other cooperate with the two locking elements 220. Each of the two diametrically opposite ribs is dimensioned to fit into the corresponding grooves 230 of the locking members 220 in a sliding manner and conforms to the configuration of the groove for interlocking engagement with the locking element to prevent rotation of the spindle relative to the locking element. Each of the two diametrically opposite ribs 240 is enlarged to provide a planar surface 242 that is inclined relative to the axis of the spindle and a planar surface 244 that is parallel to the axis of the spindle.

It is apparent that the inclined surfaces 242 of the spindle ribs cooperate with the inclined surfaces 232 of the locking elements 220 for cam action to force the locking elements radially outwardly and since the inclined surfaces of the ribs and the grooves are at the same angle relative to the axis of the spindle these surfaces make face-to-face contact throughout the cam action. Thus the cam action involves extensive mutually contacting areas as distinguished from line contact or point contact. The manner in which the inclined surfaces make extensive contact with each other is apparent in FIGURE 18.

When the locking elements 220 are fully extended as shown in FIGURE 16, the planar surfaces 234 of the grooves which are parallel with the axis of the spindle are in face-to-face abutment with the planar surfaces 244 of the ribs which are also parallel with the axis of the spindle. Thus face-to-face contact as distinguished from line contact and point contact is relied upon to keep the locking elements 220 in their fully extended positions.

For the purpose of continuously biasing the spindle 218 to its effective locking position shown in FIGURE 16, the inner end of the axial bore 216 of the fastening member 200 is closed by a disk 250 and a suitable coil spring 252 acts in compression between the disk and the inner end of the spindle 218.

When the screwdriver is inserted into the diametrical slot 208, the spindle 218 is thereby depressed for a sufficient longitudinal distance to permit the locking elements 220 to be fully retracted into the diameter of the shank 204. The fastening member may then be installed in the aligned bores of the two members 214 and 215 in the usual manner by employing the screwdriver to rotate the fastening member. When the fastener member is fully installed with its head 202 in abutment with the member 214, withdrawal of the screwdriver from the head of the fastener member permits the spring 252 to return the spindle 218 to its normal position with consequent outward camming of the locking elements 220 to their outer effective locking positions.

To remove the fastening member 200 it is merely necessary to insert a screwdriver into the diametrical slot 208 and then rotate the screw in the loosening direction. The insertion of the screwdriver into the diametrical slot automatically frees the two locking elements 220 for retraction. The outer end surfaces 254 of the locking elements are spherically curved and therefore if there is any tendency for a locking element to remain at its locking position when the fastener member 200 is unscrewed, this tendency is overcome by cam action against the spherically curved surface, the cam action being caused by the rim of the bore 212 of the member 215 acting against the spherically curved surface.

While only a limited number of embodiments of the present invention are disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

I claim:

1. In a locking fastener of the character described for insertion through aligned bores of a plurality of structural members, the combination of:
   a fastener member having a head, a shank and an axial bore through the head into the shank with the bore enlarged in the shank, said fastener member being formed with a radial aperture communicating with the enlarged portion of the axial bore;
   a radial locking element mounted in said radial aperture for radial movement between a retracted position within the configuration of said shank and a locking position extending radially from the shank;
   a spindle slidingly mounted in the axial bore and formed with an enlargement in said enlargement of the axial bore,
   one of said spindle enlargement and said locking element being formed with a groove extending longitudinally of said shank, the other of said spindle enlargement and said locking element having a portion extending into the groove to slide along the groove,
   the bottom of the groove having a longitudinal portion inclined at an acute angle to the axis of the shank to cam the locking member outward from its retracted position to its extended position in response to axial movement of the spindle in one direction,
   the surface of said longitudinal portion of the bottom of the groove being in cross section linear and perpendicular to a radius of the shank that intersects said longitudinal portion,
   the portion of the other of said spindle enlargement and locking element that extends into the groove having a surface in contact with said surface of the bottom of the groove which surface of the other of said spindle enlargement and locking element is also in cross section linear and perpendicular to said radius to cause more than point contact between the two surfaces,
   said portion of the other of said spindle enlargement and locking element that extends into the groove conforming with the cross-sectional configuration of the groove and fitting snugly slidingly in the groove to cooperate with the side walls of the groove to interlock the spindle and the locking element against relative rotation thereby to maintain said two surfaces in orientation relative to each other for at least line contact with each other throughout the outward camming of the locking element; and
   means to releasably hold the spindle in position to hold the locking element in its extended position.

2. A combination as set forth in claim 1 in which at least a portion of the surface of said other of said spindle enlargement and said locking element that cooperates with the bottom of the groove is inclined relative to the axis of the shank to cooperate with the inclined portion of the bottom of the groove during the cam action.

3. A combination as set forth in claim 2 in which both of said inclined surfaces are planar surfaces at the same angle relative to the longitudinal axis of the spindle for mutual face-to-face contact during the camming action.

4. In a locking fastener of the character described for insertion through aligned bores of a plurality of structural members, the combination of:
   a fastener member having a head, a shank, and an axial bore, said fastener member being formed with a radial aperture in communication with the axial bore;
   a radial locking element mounted in said radial aperture for radial movement between a retracted position within the configuration of said shank and a locking position extending radially from the shank; and
   a spindle slidingly mounted in the axial bore and formed with an enlargement for cam action against said radial locking element to force the radial locking element from its retracted position to its locking position,
   said spindle enlargement being formed with a groove extending longitudinally of said shank, said locking element having a portion extending into the groove and conforming to the cross section of the groove to slide along the groove and to interlock the spindle with the fastener member to substantially prevent relative rotation between the spindle and the fastener member,
   the bottom of the groove and the corresponding surface of said locking element being linear in cross section and perpendicular to a radius of the shank for more than point contact between the spindle and the locking element throughout the cam action.

5. A combination as set forth in claim 4 in which said groove of the spindle enlargement has a surface substantially parallel with the axis of the shank to hold the locking element in its extended locking position in a positive manner.

6. In a locking fastener of the character described for insertion through aligned bores of a plurality of structural members, the combination of:
- a fastener member having a head, a shank, and an axial bore, said fastener member being formed with a radial aperture in communication with the axial bore;
- a radial locking element mounted in said radial aperture for radial movement between a retracted position within the configuration of said shank and a locking position extending radially from the shank; and
- a spindle slidingly mounted in the axial bore and formed with an enlargement for cam action against said radial locking element to force the radial locking element from its retracted position to its locking position,
- said locking element having a groove in its inner end in longitudinal alignment with said spindle,
- said enlargement of the spindle having a longitudinal portion extending into said groove and conforming to the cross section of the groove to slide along the groove and cooperate with the side walls of the groove to interlock the spindle with the fastener member to substantially prevent relative rotation between the spindle and the fastener member,
- the cross section of the groove and the cross section of the corresponding portion of said spindle being perpendicular to a radius of the shank for line contact as distinguished from point contact between the locking element and the spindle throughout the cam action.

7. A combination as set forth in claim 6 in which said longitudinal portion of the spindle enlargement has a longitudinal cam surface and an adjacent longitudinal surface aligned with the cam surface, which adjacent surface is substantially parallel to the axis of the shank to hold the locking element in its extended locking position in a positive manner.

8. A combination as set forth in claim 7 in which the bottom of the groove of the locking element has a cam surface to cooperate with said cam surface of the spindle and has an adjacent surface in longitudinal alignment with the cam surface and parallel to the axis of the shank for cooperation with said adjacent surface of the spindle that is parallel with the axis of the shank.

9. In a locking fastener of the character described for insertion through aligned bores of a plurality of structural members, the combination of:
- a fastener member having a head, a shank, and an axial bore, said fastener member being formed with a radial aperture in communication with the axial bore;
- a radial locking element mounted in said radial aperture for radial movement between a retracted position within the configuration of said shank and a locking position extending radially from the shank,
- said locking element being enlarged at its inner end to greater cross section than the radial aperture to prevent radial outward escape of the locking element from the aperture,
- said locking element being formed with a groove extending longitudinally of the fastener;
- a spindle sliding mounted in the axial bore and formed with a longitudinally extending radial rib conforming in cross section to the groove and extending into the groove in sliding engagement with the groove to prevent rotation of the spindle relative to the locking element,
- said rib having a radially enlarged portion to cooperate with the bottom of the groove of the locking element for cam action to displace the locking element radially outwardly from its retracted position to its locking position,
- means to releasably maintain the spindle in a longitudinal position to hold the locking element at its extended position.

10. A combination as set forth in claim 9 in which the radial enlarged portion of the rib has a surface substantially parallel with the axis of the shank to hold the locking element in its extended locking position in a positive manner.

11. A combination as set forth in claim 9 in which both a longitudinal portion of the bottom of the groove of the locking element and a longitudinal portion of the outer surface of the rib are planar and inclined at the same angle relative to the axis of the spindle for cooperation in the cam action.

12. A combination as set forth in claim 9 in which said releasable holding means comprises spring means acting between the spindle and the fastener member.

References Cited

UNITED STATES PATENTS

| 1,459,542 | 6/1923 | McCathron | 85—66 |
| 2,472,651 | 6/1949 | Diaper | 24—211 |
| 3,180,390 | 4/1965 | Ockert | 151—69 |

FOREIGN PATENTS

| 148,882 | 3/1937 | Austria. |
| 563,435 | 8/1944 | Great Britain. |
| 377,338 | 12/1939 | Norway. |

MARION PARSONS, JR., *Primary Examiner.*